United States Patent
Anka

(10) Patent No.: US 8,782,168 B2
(45) Date of Patent: *Jul. 15, 2014

(54) GATEWAY-ASSISTED FILE TRANSFER

(71) Applicant: LogMeIn, Inc., Woburn, MA (US)

(72) Inventor: Marton B. Anka, Boston, MA (US)

(73) Assignee: LogMeIn, Inc., Boston, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/751,674

(22) Filed: Jan. 28, 2013

(65) Prior Publication Data

US 2013/0238749 A1  Sep. 12, 2013

Related U.S. Application Data

(63) Continuation of application No. 12/793,151, filed on Jun. 3, 2010, now Pat. No. 8,364,780, and a continuation of application No. 10/988,890, filed on Nov. 15, 2004, now Pat. No. 7,734,799.

(51) Int. Cl.
  *G06F 15/16* (2006.01)
(52) U.S. Cl.
  USPC .......................... 709/217; 709/203; 709/245
(58) Field of Classification Search
  USPC ................... 709/203, 217, 219, 245
  See application file for complete search history.

(56) References Cited

U.S. PATENT DOCUMENTS

| | | | | |
|---|---|---|---|---|
| 5,388,211 A | * | 2/1995 | Hornbuckle | 717/178 |
| 5,410,543 A | * | 4/1995 | Seitz et al. | 370/463 |
| 5,642,515 A | * | 6/1997 | Jones et al. | 710/220 |
| 5,732,214 A | * | 3/1998 | Subrahmanyam | 709/227 |
| 5,771,354 A | * | 6/1998 | Crawford | 709/229 |
| 5,862,330 A | * | 1/1999 | Anupam et al. | 709/204 |
| H1944 H | * | 2/2001 | Cheswick et al. | 726/11 |
| 6,587,880 B1 | * | 7/2003 | Saigo et al. | 709/225 |
| 6,912,563 B1 | * | 6/2005 | Parker et al. | 709/204 |
| 6,928,479 B1 | * | 8/2005 | Meyer et al. | 709/227 |
| 7,130,888 B1 | * | 10/2006 | Hickman et al. | 709/208 |
| 7,203,733 B1 | * | 4/2007 | Bern | 709/218 |
| 2001/0016872 A1 | * | 8/2001 | Kusuda | 709/205 |
| 2002/0124074 A1 | * | 9/2002 | Levy et al. | 709/224 |
| 2003/0033432 A1 | * | 2/2003 | Simpson et al. | 709/246 |
| 2003/0112823 A1 | * | 6/2003 | Collins et al. | 370/474 |
| 2003/0163516 A1 | * | 8/2003 | Perkins et al. | 709/203 |
| 2004/0039934 A1 | * | 2/2004 | Land et al. | 713/200 |
| 2005/0010647 A1 | * | 1/2005 | Durham | 709/212 |
| 2006/0039356 A1 | * | 2/2006 | Rao et al. | 370/352 |
| 2006/0195545 A1 | * | 8/2006 | Kikkawa et al. | 709/217 |

* cited by examiner

*Primary Examiner* — David Lazaro
(74) *Attorney, Agent, or Firm* — David H. Judson

(57) ABSTRACT

A file transfer application maintains a secure connection over the Internet with a file transfer gateway. A user selects a file and the file transfer application requests a unique ticket from the gateway. The ticket is stored in both the gateway and the file transfer application. Next, the ticket is then encoded in a URL that can be sent to potential recipients of the file via conventional methods. Upon entering the URL into a web browser, the recipient will navigate to the file transfer gateway. The gateway decodes the URL to recover the ticket and looks up the ticket in the database to determine the associated application instance and file description. The gateway will then request the application instance to start encrypting and streaming the contents of the file identified by the ticket to the gateway, which then retransmits the encrypted stream to the recipient's web browser.

5 Claims, 4 Drawing Sheets

GATEWAY-ASSISTED FILE TRANSFER

FIELD OF THE INVENTION

The subject matter herein relates to peer-to-peer file transfer systems and, more specifically, to file systems in which file transfer is mediated by a central server.

BACKGROUND OF THE INVENTION

One of the many benefits of the Internet is the ability to transfer information electronically between computers with relative ease. For example, with the popularity of the World Wide Web, transferring or downloading a file from a server to a client can be as simple as selecting the file and entering a command to download the file. However, in order to perform a file transfer of this type, both the file source computer and the file destination computer must have the appropriate and compatible software to establish a connection between the computers, to properly format the file to be transferred, and to perform the actual file transfer itself.

Electronic mail, or e-mail, has also become a popular method of communication between computers connected by the Internet. In a typical e-mail system, an e-mail client allows a user to compose a text message, generally via a visual graphic user interface. The e-mail client then interacts with a mail server that forwards the mail, via the Internet to a designated recipient. The standard protocol used for sending Internet e-mail is called SMTP, which is an acronym "Simple Mail Transfer Protocol" and the sending e-mail server is called an SMTP server. When an e-mail client sends an e-mail message, the sender's computer routes the message to an SMTP server. The server examines the e-mail address in the message, and then forwards the message to the recipient's mail server. An SMTP server works in conjunction with a POP server. POP stands for Post Office Protocol and the POP server at the recipient's computer receives e-mail messages from the SMTP server. After receiving an e-mail message, the POP server stores it until the addressee retrieves it.

An e-mail system makes it simple to send and receive text messages. Generally, e-mail systems are able to transmit and receive non-text based "attachments" by encoding files of binary information (such as pictures or images) according to a MIME (Multipurpose Internet Mail Extension) specification so that they appear to be text. For example, when an e-mail server sends an e-mail message with a binary file attachment, the server first retrieves the file from its storage location and then uses a software utility that converts the binary file into a file that is composed of text characters, such as ASCII characters. The "text" file can then be included as part of a text e-mail message. When the message is received, the recipient, or their e-mail program, runs decoding software to convert the "text" file to the original binary file format.

Because binary file attachments are converted into files using text characters, attachments result in a 33% larger file when encoded with Base64 encoding, which is the de facto standard. Large e-mail messages must still be downloaded from the recipient's mail server to the mail client, thereby resulting in sizable download times. In order to manage the download times, many mail systems, especially those systems that operate with low bandwidth Internet systems, such as dial up systems, limit the size of attachments to a predetermined maximum size, for example two megabytes. Any attachments over the predetermined size are either removed by the e-mail server or the e-mail server might refuse to deliver the entire message. This can be a problem for users who regularly sent large attachments, such as multimedia content.

In order to circumvent this problem, file transfer systems that operate outside of the regular e-mail system have been developed. Typically, these systems are server based. A user who wishes to transfer a large file to a recipient first sends the file to a special file server and receives a link to the file from the gateway. The user then sends an e-mail to the recipient with the link as an attachment. When the recipient receives the e-mail with the link, he or she uses the link to navigate to the file server and then download the file from the file server. The file may be encrypted by the file server before downloading.

A problem with the aforementioned systems is that the server becomes a bottleneck, since generally large files must be first uploaded to it, perhaps encrypted and then downloaded from it, often over low bandwidth links. Therefore, there is a need for a simpler file transfer system that does not require uploading a file to a server.

SUMMARY OF THE INVENTION

In accordance with the principles herein, a file transfer application running on a user's computer maintains a secure connection over the Internet with a file transfer gateway. When the user wants to send a file to a recipient, the user uses the file transfer application to select a file on his or her computer and the file transfer application requests from the gateway a unique ticket. In one embodiment, the unique ticket can be a short string of random characters.

This ticket is stored in a database on the gateway, where it is associated with the instance of the application that requested its creation and a short description of the selected file. The ticket is also stored in the file transfer application, where it is associated with the exact name and location of the file. Next, the ticket is then encoded in a URL that can be sent to potential recipients of the file via conventional electronic communication methods, such as e-mail or instant messaging. When a recipient receives the message containing the URL, he or she enters the URL into a web browser that will then navigate to the file transfer gateway. When the user arrives, the gateway decodes the URL to recover the ticket, looks up the ticket in the database to determine the associated application instance and file description. In another embodiment, the file description is sent to the file recipient where it is displayed in the recipient's web browser during the file download.

The gateway will then request the application instance to start encrypting and streaming the contents of the file identified by the ticket to the gateway. The gateway will then retransmit the encrypted stream to the recipient's web browser. When the recipient's computer receives the encrypted stream, the recipient will view a "save as" dialog box that is generated by the web browser. After the recipient selects the appropriate response, the download proceeds normally.

In still another embodiment, the gateway would facilitate the recipient's browsing a folder on the sending user's computer, with folder contents streamed by the file transfer application when the files are requested by the recipient in an on-demand fashion.

In still another embodiment, the URL that contains the encoded ticket would only grant the recipient access to a login page on the gateway. Once the recipient has used the URL to navigate to the login page, in order to access the file itself, the recipient would be required to enter a password which was set by the user who originally selected the file for distribution.

This password would have to be communicated between the recipient and the user distributing the file by a mechanism outside the file transfer system.

In yet another embodiment, the gateway might temporarily cache frequently requested files, thereby alleviating the load on the sender's potentially slower upstream connection. In this case, files would be served by the gateway from its internal storage after the gateway contacts the application on the sender's computer and verifies that the file is still available for recipients to download.

BRIEF DESCRIPTION OF THE DRAWINGS

The above and further advantages of the invention may be better understood by referring to the following description in conjunction with the accompanying drawings in which.

DETAILED DESCRIPTION

Figure 1:
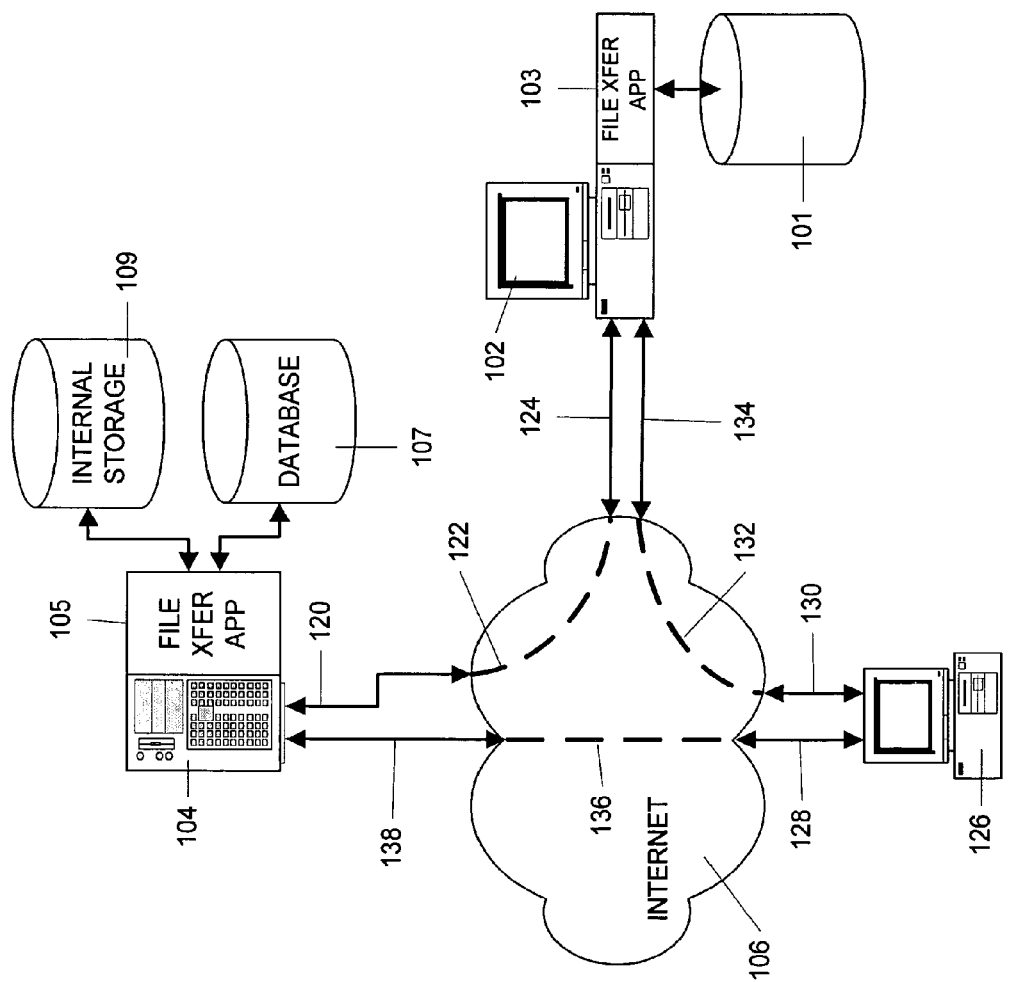
FIG. 1 is a block schematic diagram showing various connections between file source and file recipient computers and between those computers and a gateway server.
Figure 2A:
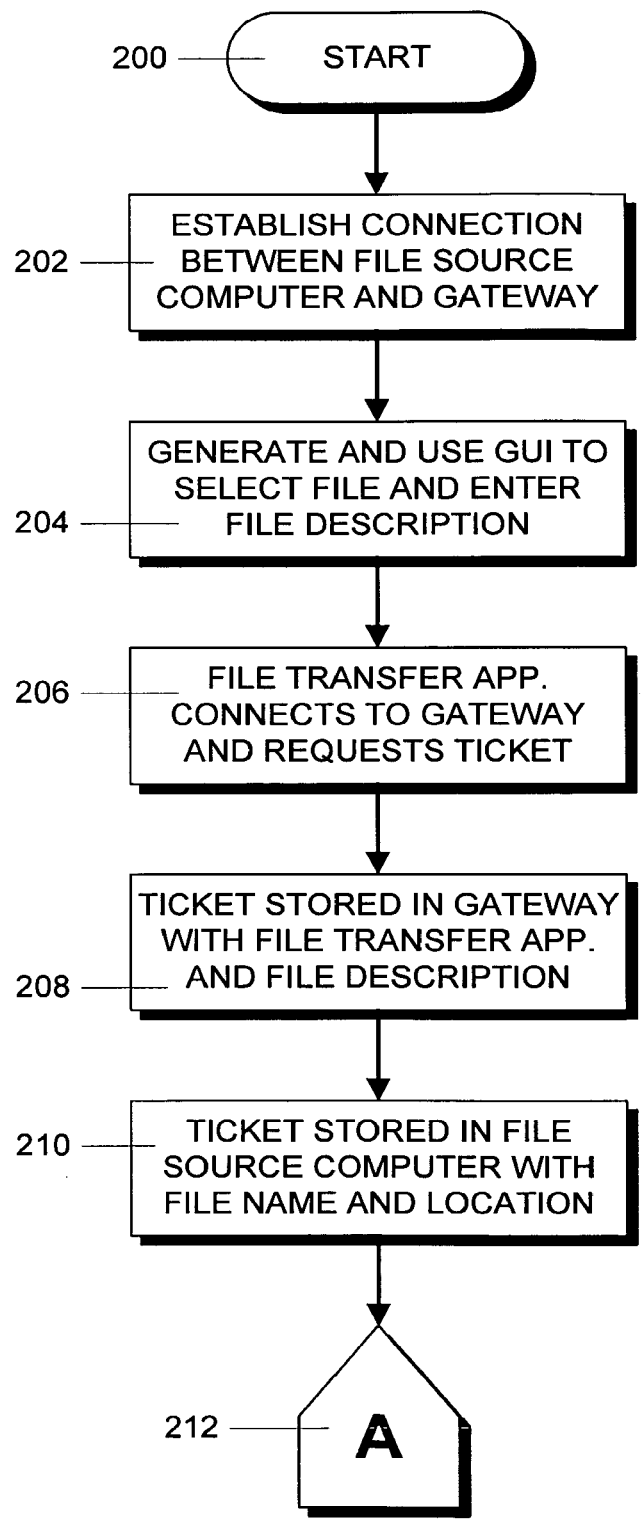
FIGS. 2A, 2B and 2C, when placed together, form a flowchart showing the steps in an illustrative process for initiating a file transfer in accordance with the principles of the invention.
Figure 2B:
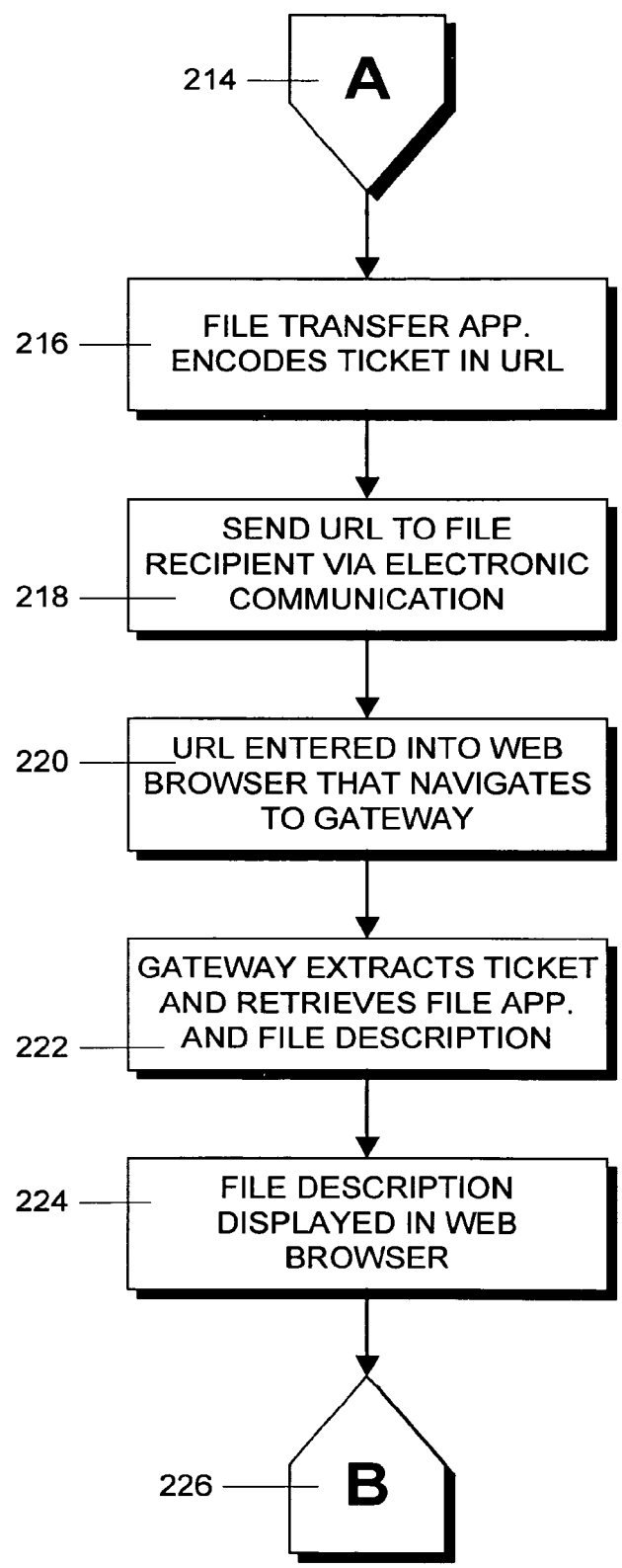
Figure 2C:
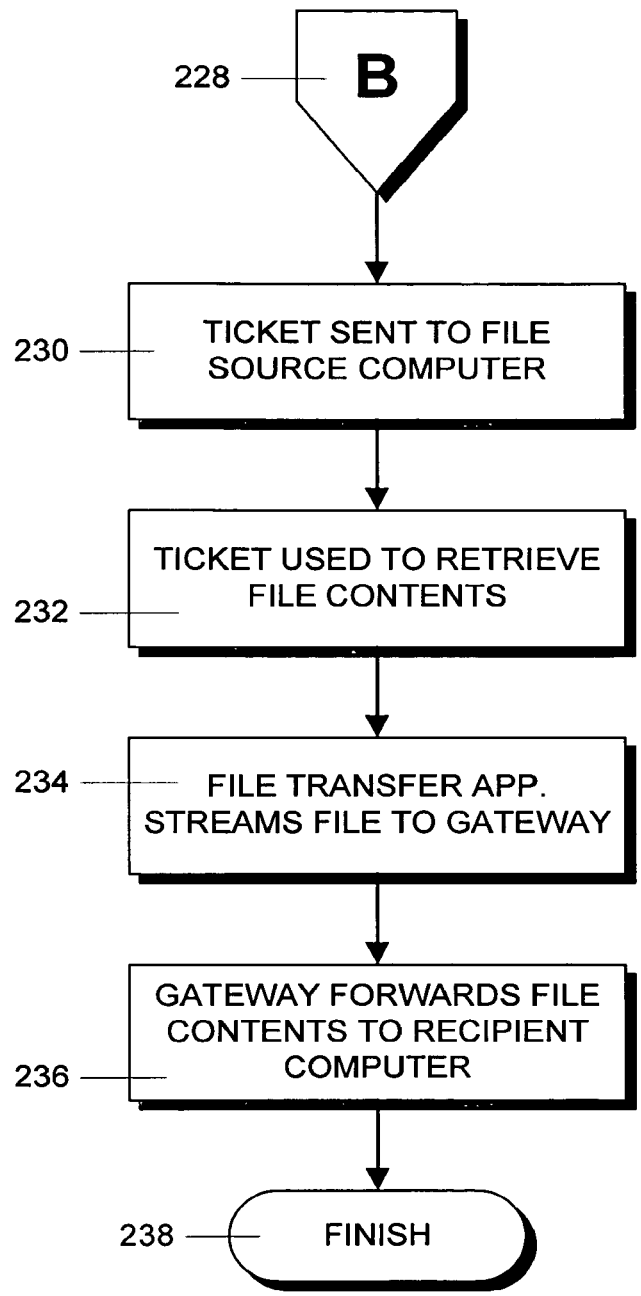

FIG. 1 is a schematic diagram illustrating the connections that are set up between a file source computer 102, a file recipient computer 126 and a transfer gateway 104 during the initiation of a file transfer by means of the steps shown in the process illustrated in FIGS. 2A, 2B and 2C in accordance with the principles of the invention. The file source computer 102 is the source of the file which is to be transferred to the file recipient computer 126. This process starts in step 200 and proceeds to step 202 where a connection is established between the file source computer 102 and a file transfer gateway 104.

In a gateway system, such as that shown in FIG. 1, the file source computer 102 may continually maintain a connection with the gateway 104. In general, this connection is either automatically set up when the host computer 102 logs onto the Internet 106 as illustrated schematically by arrow 124. Alternatively, a user at the file source computer may log into the gateway directly in order to establish the connection. A connection is set up through the Internet as indicated schematically by arrow 122 to the gateway 104, which is also connected to the Internet 106 as indicated by arrow 120.

The gateway 104 solves the problem introduced by firewalls, NAT routers and dynamic IP addresses, since neither the recipient computer 126 nor the file source computer 102 attempts to contact each other directly; they both initiate connections to the gateway 104 and transfer information through it instead. The gateway 104 is configured so that it is always accessible, usually through a common Internet protocol, such as HTTP or HTTPS. Thus, any computer that is configured to perform simple Internet-related tasks, such as browsing the World Wide Web, can be turned into a file source computer or a recipient computer.

Returning to FIGS. 2A, 2B and 2C, once a connection has been established between the file source computer 102 and the gateway 104, the user can start and control a file transfer application 103 that resides on file source computer 102. In particular, this file transfer application 103 generates a graphic user interface that is displayed on the file source computer 102. The graphic user interface can be used to select a file for transfer and to allow the user to enter a short description of the file as indicated in step 204.

Once a file is selected, in step 206, the file transfer application 103 communicates with a file transfer application 105 that is running in the gateway 104 via the previously established path (arrows 124, 122 and 120). The file transfer application 103 requests that the file transfer application 105 generate a unique "ticket" and forwards to the file transfer application 105 the short file description entered by the user and additional "metadata", such as a file size. The unique ticket comprises a short string of random text characters, for example, "abcdefghijklmnopqrstuvwxzy1234567890" characters. This ticket is stored in two places. First, as indicated in step 208, the ticket is stored by the file transfer application 105 in the database 107 on the gateway 104 along with the identification of the file transfer application instance that requested that it be generated (in this case file transfer application 103) and the short description of the file to be transferred that was generated by the user.

In addition, as indicated in step 210, the ticket is returned, via the existing pathway, to the file transfer application 103 where it is stored in database 101 associated with the exact name and location of the selected file. The process then proceeds, via off-page connectors 212 and 214, to step 216.

In step 216, the file transfer application 103 encodes the ticket and the uniform resource locator (URL) of the gateway 104 into another URL. This encoding is performed, for example, by appending the ticket to the URL of the gateway 104.

Once encoded, this latter URL can be sent to a potential recipient of the file via conventional means, such as email or instant messaging, as set forth in step 218. For example, a user at the file source computer 102 might send an email containing the URL via the Internet 106, to a potential recipient 126 as indicated by arrows 134, 132 and 130.

A potential recipient user located, for example, at computer 126, can enter the URL received in the email into a conventional web browser running in the computer 126. This URL causes the web browser to navigate to a secure website (for example, an https website) running on the gateway 104 as set forth in step 220 and as indicated schematically by arrows 128, 136 and 138.

Once the recipient has navigated to the website, as set forth in step 222, the gateway 104 extracts the ticket from the URL and uses the ticket to access the database 107 in order to retrieve the associated application instance and the file description that was entered by the user who selected the file for distribution, both of which were previously stored in step 208. If the application instance and file description are located in the database 107, the gateway 104 verifies that the file source computer 102 is still on-line. If the file source computer is on-line, the file name and description, and additionally the file metadata, such as the file size, are then sent to the recipient computer 126, via the path 128, 136 and 138, and displayed in the web browser as indicated in step 224. The process then proceeds, via off-page connectors 226 and 228, to step 230.

If the user at the recipient computer desires to receive the file, he or she can select the file name by clicking on it as it is displayed in the web browser. In step 230, selecting the file name causes the file transfer application 105 to send the ticket to the file transfer application 103 over the previously established path 120, 122 and 124. Along with the ticket, the file transfer application sends a request that the file transfer application 103 begin streaming the file contents to the gateway 104. In step 232, the application 103 uses the ticket to retrieve the name and location of the file from database 101 and, in step 234, the application 103 begins to stream the file to the gateway, via the path 124, 122 and 120. The file transfer application 103 may also encrypt the file contents before streaming them to the gate way 104.

In step 236, the gateway 104 sends an HTTP 200 response followed by the streaming file contents, via the path 138, 136 and 128 to the web browser in recipient computer 126. In accordance with normal download operation, the web browser will display a "save as" dialog. Once the recipient user responds appropriately, the download proceeds normally and the process finishes in step 238.

In another embodiment, instead of distributing a single file, a user may wish to distribute a folder that contains a plurality of files. In general, the mechanism for distributing a folder would be the same as described above, with the exception that the gateway 104 and the file source computer 102 would facilitate browsing of the folder by the recipient. The recipient could then select and download one or more of the files in the folder.

In still another embodiment, when the recipient user enters the URL into the web browser at recipient computer 126, the recipient user would then navigate to a login page that requires a password to access the file or folder. The password would be transmitted from the user distributing the file to the recipient user by means outside of the file transfer system, such as telephone, email or instant messaging.

In yet another embodiment, after streaming a file to the recipient computer 126, the gateway 104 might temporarily cache a frequently-requested file in an internal storage 109, thereby alleviating the load on the sender's potentially slower upstream connection the next time that file is requested. If the file is cached, instead of sending the ticket to the file source computer in step 230, the file would be streamed directly from the gateway 104 out of its internal storage 109 after the gateway contacts the application instance 103 on the file source computer 102 and verifies that the file source computer 102 is still on-line and that the requested file is still available for recipients to download. Another mechanism, such as a timer, could be used to remove the file from the gateway storage 109 after a period of time during which the file is not requested in order to prevent the file storage 109 from filling with obsolete files.

A software implementation of the above-described embodiment may comprise a series of computer instructions fixed on a non-transitory tangible medium, such as a computer readable media, for example, a diskette, a CD-ROM, a ROM memory, or a fixed disk. The medium is a tangible medium. The series of computer instructions embodies all or part of the functionality previously described herein. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, protocols and translations different from those shown may be performed. Other aspects, such as the specific process flow and the order of the illustrated steps, as well as other modifications to the inventive concept are intended to be covered by the appended claims.

What is claimed is as follows:

1. A non-transitory computer program product comprising computer program instructions executed in association with a gateway system to control transfer of a file from a first computer to a second computer, each of the first and second computers being distinct from the gateway system, the first computer having a file transfer application instance, the computer program instructions comprising:

program instructions adapted to receive a first request from the first computer, the request associated with a file to be transferred from the first computer to the second computer;

program instructions responsive to the first request and adapted to associate a random character string with an identifier and data associated with the file, the identifier being associated with the file transfer application;

program instructions adapted to receive of a second request from the second computer, the request associated with a URL that encodes at least the random character string, and to obtain the random character string and thereby identify the file and the file transfer application instance; and program instructions responsive to the second request and adapted to instruct the file transfer application to enable a transfer of the file from the first computer to the second computer.

2. The computer program product as described in claim 1 further including program instructions to establish and maintain a connection to the first computer.

3. The computer program product as described in claim 2 further including program instructions adapted to receive the file over the connection, and to forward the file to the second computer.

4. The computer program product as described in claim 2 wherein the connection is a secure connection.

5. The computer program product as described in claim 1 wherein the URL also encodes a second URL associated with a location of the gateway system.

* * * * *